United States Patent
Kaye et al.

(10) Patent No.: US 11,228,074 B2
(45) Date of Patent: Jan. 18, 2022

(54) RECHARGEABLE BATTERY WITH ANION CONDUCTING POLYMER

(71) Applicant: Apple Inc., Cupertino, CA (US)

(72) Inventors: Steven Kaye, Oakland, CA (US); William A. Braff, Palo Alto, CA (US); Maria N. Luckyanova, San Francisco, CA (US); Ghyrn E. Loveness, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 16/683,088

(22) Filed: Nov. 13, 2019

(65) Prior Publication Data

US 2020/0083507 A1 Mar. 12, 2020

Related U.S. Application Data

(63) Continuation-in-part of application No. 16/613,094, filed as application No. PCT/US2018/033218 on May 17, 2018.
(Continued)

(51) Int. Cl.
*H01M 50/411* (2021.01)
*H01M 4/38* (2006.01)
(Continued)

(52) U.S. Cl.
CPC .......... *H01M 50/411* (2021.01); *H01M 4/38* (2013.01); *H01M 4/50* (2013.01); *H01M 4/505* (2013.01);
(Continued)

(58) Field of Classification Search
None
See application file for complete search history.

(56) References Cited

U.S. PATENT DOCUMENTS

| 4,317,864 A | 3/1982 | Strasser |
| 4,374,186 A | 2/1983 | McCartney et al. |

(Continued)

FOREIGN PATENT DOCUMENTS

| CN | 1620735 A | 5/2005 |
| CN | 101809801 A | 8/2010 |

(Continued)

OTHER PUBLICATIONS

U.S. Appl. No. 16/108,498, "Non-Final Office Action", dated Apr. 30, 2020, 28 pages.
(Continued)

*Primary Examiner* — Daniel S Gatewood
(74) *Attorney, Agent, or Firm* — Kilpatrick Townsend & Stockton, LLP

(57) ABSTRACT

Batteries are described that include a cathode material, and anode material, and a polymeric material that separates the cathode material from the anode material. The polymeric material has hydroxide ion conductivity of at least about 50 mS/cm, and a diffusion ration of hydroxide ions to at least one type of metal ion of at least about 10:1. Also described are methods of making a battery that include forming a layer of polymeric material between a first electrode and second electrode of the battery. In additional methods, the polymeric material is coated on at least one of the electrodes of the battery. In further methods, the polymeric material is admixed with at least one of the electrode materials to make a composite electrode material that is incorporated into the electrode.

12 Claims, 8 Drawing Sheets

Related U.S. Application Data

(60) Provisional application No. 62/508,487, filed on May 19, 2017.

(51) Int. Cl.
  *H01M 4/50* (2010.01)
  *H01M 10/0565* (2010.01)
  *H01M 10/26* (2006.01)
  *H01M 10/28* (2006.01)
  *H01M 4/505* (2010.01)
  *H01M 4/525* (2010.01)
  *H01M 4/62* (2006.01)
  *H01M 50/46* (2021.01)
  *H01M 50/403* (2021.01)

(52) U.S. Cl.
  CPC ............ *H01M 4/525* (2013.01); *H01M 4/622* (2013.01); *H01M 10/0565* (2013.01); *H01M 10/26* (2013.01); *H01M 10/28* (2013.01); *H01M 50/403* (2021.01); *H01M 50/46* (2021.01); *H01M 2300/0014* (2013.01); *H01M 2300/0082* (2013.01)

(56) References Cited

U.S. PATENT DOCUMENTS

| | | | |
|---|---|---|---|
| 4,567,119 A | 1/1986 | Lim | |
| 5,162,169 A | 11/1992 | Tomantschger et al. | |
| 5,162,172 A | 11/1992 | Kaun | |
| 5,254,415 A | 10/1993 | Williams et al. | |
| 5,367,431 A | 11/1994 | Kunishi et al. | |
| 5,837,158 A | 11/1998 | Shepodd et al. | |
| 6,004,698 A | 12/1999 | Richardson et al. | |
| 8,124,266 B2 | 2/2012 | Yamazaki | |
| 8,163,410 B2 | 4/2012 | Fulop et al. | |
| 8,357,469 B2 | 1/2013 | Shaffer et al. | |
| 8,663,833 B2 | 3/2014 | Hosaka et al. | |
| 9,142,811 B2 | 9/2015 | Chami | |
| 10,916,741 B1 | 2/2021 | Dafoe et al. | |
| 10,916,796 B1 | 2/2021 | Zeilinger et al. | |
| 10,923,728 B1 | 2/2021 | Zeng | |
| 11,018,343 B1 | 5/2021 | Dafoe et al. | |
| 11,043,703 B1 | 6/2021 | Zeng et al. | |
| 2001/0038939 A1 | 11/2001 | Bailey | |
| 2002/0146620 A1 | 10/2002 | Connell | |
| 2003/0027051 A1 | 2/2003 | Kejha et al. | |
| 2003/0096170 A1 | 5/2003 | Fujiwara et al. | |
| 2005/0106456 A1 | 5/2005 | Puester et al. | |
| 2007/0210760 A1 | 9/2007 | Shimamura et al. | |
| 2008/0187824 A1 | 8/2008 | Tomantschger | |
| 2009/0023059 A1 | 1/2009 | Kinoshita et al. | |
| 2009/0068531 A1 | 3/2009 | Sawa et al. | |
| 2009/0136832 A1 | 5/2009 | Aihara et al. | |
| 2009/0233175 A1 | 9/2009 | Kelley et al. | |
| 2010/0134942 A1 | 6/2010 | Wang et al. | |
| 2011/0014532 A1 | 1/2011 | Knuckey et al. | |
| 2011/0294007 A1 | 12/2011 | Hosaka et al. | |
| 2012/0156552 A1 | 6/2012 | Miyazaki et al. | |
| 2012/0189896 A1* | 7/2012 | Zhou ................ | H01M 50/411 429/144 |
| 2012/0263995 A1 | 10/2012 | Naito et al. | |
| 2013/0065106 A1 | 3/2013 | Faust | |
| 2013/0089774 A1 | 4/2013 | Chami | |
| 2014/0127542 A1 | 5/2014 | Li et al. | |
| 2014/0154542 A1* | 6/2014 | Issaev ................ | H01M 6/045 429/90 |
| 2014/0178735 A1 | 6/2014 | Wang et al. | |
| 2015/0200393 A1 | 7/2015 | Li et al. | |
| 2015/0236543 A1 | 8/2015 | Brushett et al. | |
| 2015/0280259 A1 | 10/2015 | Anderson et al. | |
| 2015/0325894 A1 | 11/2015 | Merriman et al. | |
| 2016/0049646 A1 | 2/2016 | Fujiki et al. | |
| 2016/0049679 A1 | 2/2016 | Stevens et al. | |
| 2016/0099456 A1 | 4/2016 | Kwon et al. | |
| 2016/0111729 A1 | 4/2016 | Kim et al. | |
| 2016/0197352 A1 | 7/2016 | Blaser et al. | |
| 2016/0248113 A1 | 8/2016 | He et al. | |
| 2016/0329535 A1 | 11/2016 | Moomaw et al. | |
| 2017/0133689 A1* | 5/2017 | Moore ................ | C08F 212/18 |
| 2017/0214057 A1 | 7/2017 | Kotik et al. | |
| 2017/0250434 A1 | 8/2017 | Gennett et al. | |
| 2018/0013144 A1 | 1/2018 | Li et al. | |
| 2018/0079721 A1 | 3/2018 | Armand et al. | |
| 2018/0097248 A1 | 4/2018 | Nariyama et al. | |
| 2018/0175427 A1 | 6/2018 | Nariyama | |
| 2018/0175470 A1 | 6/2018 | Bai et al. | |
| 2018/0226654 A1 | 8/2018 | Ohsawa et al. | |
| 2018/0294454 A1 | 10/2018 | Mackenzie et al. | |
| 2018/0316063 A1* | 11/2018 | Masel ................ | H01M 50/411 |
| 2019/0036147 A1 | 1/2019 | Yuan et al. | |
| 2019/0237748 A1 | 8/2019 | Shin et al. | |
| 2020/0028166 A1 | 1/2020 | Tanaka et al. | |
| 2020/0212440 A1 | 7/2020 | Kolhekar et al. | |
| 2021/0028457 A1 | 1/2021 | Newhouse et al. | |

FOREIGN PATENT DOCUMENTS

| | | | |
|---|---|---|---|
| CN | 102005566 A | 4/2011 | |
| CN | 102187504 A | 9/2011 | |
| CN | 102272977 A | 12/2011 | |
| CN | 102341948 A | 2/2012 | |
| CN | 102576850 A | 7/2012 | |
| CN | 103069614 A | 4/2013 | |
| CN | 103165920 A | 6/2013 | |
| CN | 103222098 A | 7/2013 | |
| CN | 103548196 A | 1/2014 | |
| CN | 103904294 A | 7/2014 | |
| EP | 1125336 A1 | 8/2001 | |
| EP | 2892097 A1 | 7/2015 | |
| EP | 3435473 A1 | 1/2019 | |
| JP | 0562683 A | 3/1993 | |
| JP | 06503442 A | 4/1994 | |
| JP | 3522303 B2 | 4/2004 | |
| JP | 2005005163 A | 1/2005 | |
| JP | 2006012556 A | 1/2006 | |
| JP | 2007012584 A | 1/2007 | |
| JP | 2009224097 A * | 10/2009 | |
| JP | 2009224097 A | 10/2009 | |
| JP | 2011071011 A | 4/2011 | |
| JP | 4857710 B2 | 1/2012 | |
| JP | 2012234823 A | 11/2012 | |
| JP | 2013114746 A | 6/2013 | |
| JP | 2013187074 A | 9/2013 | |
| JP | 5410822 B2 | 2/2014 | |
| JP | 2014029818 A * | 2/2014 | |
| JP | 2014029818 A | 2/2014 | |
| KR | 20130066795 A | 6/2013 | |
| WO | 8504287 A1 | 9/1985 | |
| WO | 9210861 A1 | 6/1992 | |
| WO | 2010111087 A1 | 9/2010 | |
| WO | WO-2010111087 A1 * | 9/2010 | ............ H01M 10/32 |
| WO | 2016031689 A1 | 3/2016 | |
| WO | 2017007827 A1 | 1/2017 | |
| WO | 2018057566 A1 | 3/2018 | |
| WO | 2018195372 A1 | 10/2018 | |
| WO | 2018213601 A2 | 11/2018 | |
| WO | 2019023010 A1 | 1/2019 | |
| WO | 2019245461 A1 | 12/2019 | |

OTHER PUBLICATIONS

U.S. Appl. No. 16/273,625, "Non-Final Office Action", dated May 4, 2020, 54 pages.

U.S. Appl. No. 16/007,534, "Non-Final Office Action", dated May 5, 2020, 47 pages.

Chinese Patent Application No. 201680039891.9, "Office Action", dated Jan. 6, 2020, 23 pages.

Korean Patent Application No. 10-2018-7000263, "Notice of Decision to Grant", dated Apr. 8, 2020, 2 pages.

Japan Patent Application No. 2018-500449, "Notice of Decision to Grant", dated Nov. 18, 2019, 2 pages.

(56) References Cited

OTHER PUBLICATIONS

U.S. Appl. No. 16/049,250, "Non-Final Office Action", dated Apr. 8, 2020, 8 pages.
U.S. Appl. No. 15/962,133, "Notice of Allowance", dated Feb. 9, 2021, 8 pages.
U.S. Appl. No. 16/108,522, "Notice of Allowance", dated Feb. 26, 2021, 8 pages.
U.S. Appl. No. 16/273,625, "Final Office Action", dated Feb. 16, 2021, 14 pages.
U.S. Appl. No. 16/538,660, "Non-Final Office Action", dated Feb. 16, 2021, 12 pages.
EPO Patent Application No. 16738994.9, "Communication Pursuant to Rules 161(1) and 162 EPC", dated Mar. 23, 2018, 3 pages.
Japan Patent Application No. 2018-500449, "Office Action", dated Jan. 21, 2019, 11 pages.
Korea Patent Application No. 10-2018-7000263, "Office Action", dated Feb. 28, 2019, 5 pages.
Korea Patent Application No. 10-2018-7000263, "Office Action", dated Sep. 27, 2019, 16 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Preliminary Report on Patentability", dated Apr. 4, 2019, 12 pages.
PCT/US2017/052413, "International Search Report and Written Opinion", dated Feb. 1, 2018, 19 pages.
PCT/US2017/052413, "Invitation to Pay Additional Fees and, Where Applicable, Protest Fee", Dec. 8, 2017, 11 pages.
PCT/US2018/028472, "International Preliminary Report on Patentability", dated Oct. 31, 2019, 10 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
PCT/US2018/042598, "International Search Report and Written Opinion", dated Oct. 2, 2018, 14 pages.
U.S. Appl. No. 16/108,498, "Non-Final Office Action", dated May 17, 2021, 21 pages.
U.S. Appl. No. 16/108,503, "Final Office Action", dated May 25, 2021, 9 pages.
U.S. Appl. No. 16/245,542, "Non-Final Office Action", dated May 11, 2021, 14 pages.
U.S. Appl. No. 16/522,475, "Non-Final Office Action", dated May 17, 2021, 17 pages.
U.S. Appl. No. 16/748,586, "Non-Final Office Action", dated May 14, 2021, 12 pages.
PCT/US2018/042598, "International Preliminary Report on Patentability", dated Feb. 6, 2020, 10 pages.
U.S. Appl. No. 16/038,865, "Non-Final Office Action", dated Nov. 6, 2020, 13 pages.
U.S. Appl. No. 16/263,890, "Notice of Allowance", dated Oct. 23, 2020, 8 pages.
U.S. Appl. No. 15/742,009, "Non-Final Office Action", dated Nov. 15, 2019, 14 pages.
Japan Patent Appl. No. 2018-500449, "Notice of Decision to Grant", dated Nov. 18, 2019, 2 pages.
PCT/US2018/033218, "International Preliminary Report on Patentability", dated Nov. 28, 2019, 9 pages.
U.S. Appl. No. 16/038,865, "Final Office Action", dated Jun. 1, 2021, 7 pages.
China Patent Application No. 201780053071.X, "Office Action", dated Apr. 16, 2021, 21 pages.
U.S. Appl. No. 15/962,133, "Non-Final Office Action", dated Jan. 21, 2020, 37 pages.
Chinese Patent Application No. 201680039891.9, "Office Action", dated Jan. 6, 2020, 21 pages.
PCT/US2020/060348, "International Search Report and Written Opinion", dated Mar. 12, 2021, 9 pages.
PCT/US2020/060350, "International Search Report and Written Opinion", dated Mar. 12, 2021, 12 pages.
Weng, et al., "Three-Electrolyte Electrochemical Energy Storage Systems Using Both Anion- And Cation-Exchange Membranes as Separators", Energy, vol. 167, Jan. 15, 2019, pp. 1011-1018.
U.S. Appl. No. 15/962,133, "Final Office Action", dated Jul. 7, 2020, 23 pages.
Chinese Patent Application No. 201680039891.9, "Office Action", dated Jun. 10, 2020, 18 pages.
U.S. Appl. No. 16/263,890, "Non-Final Office Action", dated Jun. 16, 2020, 9 pages.
U.S. Appl. No. 15/742,009, "Final Office Action", dated Aug. 19, 2020, 13 pages.
U.S. Appl. No. 16/108,522, "Non-Final Office Action", dated Sep. 9, 2020, 10 pages.
European Patent Application 16738994.9, "Notice of Decision to Grant", dated Sep. 24, 2020, 2 pages.
U.S. Appl. No. 16/049,250, "Notice of Allowance", dated Oct. 7, 2020, 22 pages.
U.S. Appl. No. 16/108,503, "Non-Final Office Action", dated Oct. 2, 2020, 61 pages.
U.S. Appl. No. 15/742,009, "Non-Final Office Action", dated Aug. 3, 2021, 16 pages.
U.S. Appl. No. 16/038,865, "Notice of Allowance", dated Aug. 13, 2021, 8 pages.
U.S. Appl. No. 16/855,170, "Non-Final Office Action", dated Jul. 27, 2021, 13 pages.
U.S. Appl. No. 15/742,009, "Non-Final Office Action", dated Nov. 30, 2020, 13 pages.
U.S. Appl. No. 16/007,534, "Notice of Allowance", dated Nov. 18, 2020, 7 pages.
U.S. Appl. No. 16/108,498, "Final Office Action", dated Dec. 9, 2020, 25 pages.
China Patent Application No. 201680039891.9, "Office Action", dated Oct. 27, 2020, 8 pages.
U.S. Appl. No. 16/683,091, "Non-Final Office Action", dated Aug. 18, 2021, 22 pages.
U.S. Appl. No. 16/855,170, "Notice of Allowance", dated Sep. 24, 2021, 9 pages.
Boeva et al., "Soluble and Highly Ionically Conducting Interpolyelectrolyte Complexes Prepared Via Chemical Template Polymerization of Aniline in the Presence of Perfluorinated Polysulfonic Acid", The Royal Society of Chemistry, vol. 4, No. 100, Oct. 2014, pp. 56677-56681.
Thuc et al., "Study on Synthesis and Characterization of Anion Exchange Membrane Based on Poly (Vinyl Alcohol) Modified by Freeradical Polymerization", International Journal of Electrochemical Science, vol. 15, Aug. 2020, pp. 8190-8199.

\* cited by examiner

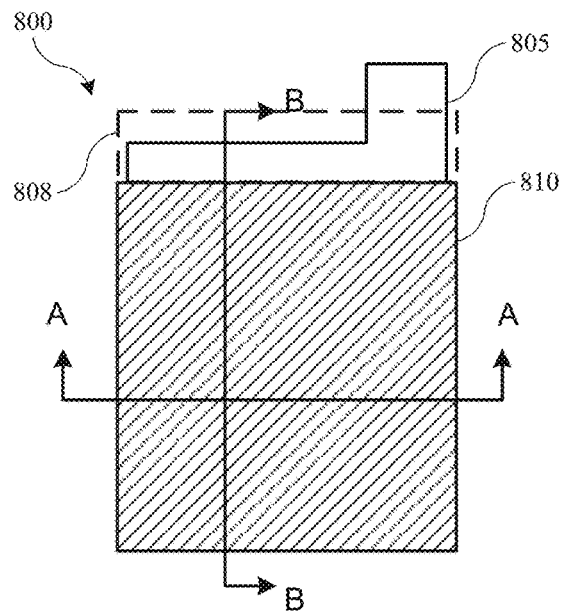
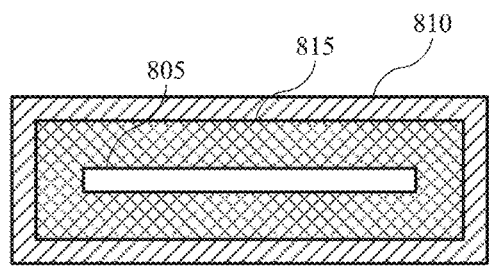
*FIG. 8A*
*FIG. 8B*
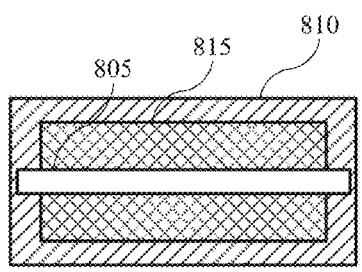
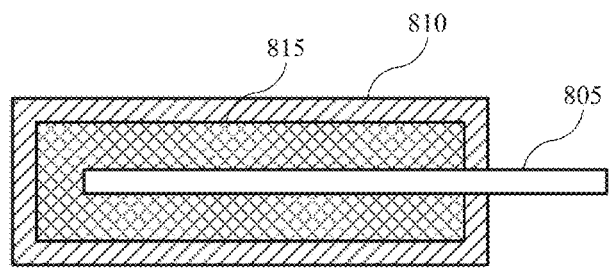
*FIG. 8C*
*FIG. 8D*

RECHARGEABLE BATTERY WITH ANION CONDUCTING POLYMER

CROSS REFERENCE TO RELATED APPLICATION

This application is a continuation-in-part of U.S. application Ser. No. 16/613,094 filed Nov. 12, 2019, which is the National Stage of International Application No. PCT/US2018/033218 filed May 17, 2018, which claims the benefit of U.S. Application Ser. No. 62/508,487 filed May 19, 2017. The entire disclosures of the applications are hereby incorporated by reference for all purposes.

TECHNICAL FIELD

The present technology relates to batteries and battery components. More specifically, the present technology relates to polymer incorporation in rechargeable battery cell designs.

BACKGROUND

In battery-powered devices, electrode ion diffusion may be associated with capacity loss and electrode degradation. To maintain adequate electrolyte movement, separator designs may include levels of porosity that may exacerbate these issues. Improved designs are needed.

SUMMARY

The present technology relates to energy storage devices, including battery cells and batteries, which may include zinc alkaline batteries or lithium-ion batteries having a variety of shapes including wound cells, and stacked cells, which may be or include bipolar batteries as well as batteries stacked in any orientation including vertical and horizontal, for example. These devices may include current collectors configured based on a z-direction transmission of current through the cell components, although current collectors configured based on an xy-direction transmission of current may also benefit from the present designs, as well as wound, cylindrical, prismatic, and other battery configurations. The cells may include a host of features and material configurations as will be described throughout this disclosure.

Energy storage devices, battery cells, and batteries of the present technology may include a first current collector and a second current collector. The batteries may include an anode material coupled with the first current collector. The batteries may include a cathode material coupled with the second current collector. The batteries may also include a polymeric material coupled between the cathode material and the anode material. The polymeric material may be characterized by a cationic backbone. The polymeric material may be configured to selectively provide anionic transport across the polymeric material while limiting cationic transport across the polymeric material.

In some embodiments, the polymeric material is further configured to provide transport of hydroxide anions across the polymeric material while limiting transport of metal-containing anionic complexes across the polymeric material. The batteries may further include a separator positioned between the anode material and the cathode material. The polymeric material may be coupled with the separator. The polymeric material may be positioned between the separator and the anode material or may be positioned between the separator and the cathode material. The anode material may include a zinc-containing material, and the cathode material may include a manganese-containing material in exemplary batteries, although other combinations of metals may be used. For example, the cathode material may include nickel oxide hydroxide, alpha manganese dioxide, delta manganese dioxide, gamma manganese dioxide, or silver oxide, among other metal oxides and hydroxide materials that may operate at similar potentials. The batteries may also include a KOH solution as an electrolyte of the battery. The polymeric material may be configured to afford distribution of hydroxide ions across the polymeric material, and may be configured to limit metal-containing ions or anionic molecules larger than hydroxide from traveling across or through the polymeric material. The polymeric material may be coupled with the first current collector or the second current collector at a lateral region of the polymeric material. The polymeric material may be characterized by a thickness less than 0.1 mm. The polymeric material may be characterized by a diffusion ratio of water relative to metal ions of greater than 1,000. In some embodiments, the polymeric material may be functionalized to include hydroxide anions associated with the cationic backbone.

The present technology also encompasses battery cells, which may include an anode active material. The battery cells may include a cathode active material. The battery cells may include a separator positioned between the anode active material and the cathode active material. The cells may also include a binder admixed with at least one of the anode active material or the cathode active material. The binder may include a polymeric material configured to selectively provide anionic transport across the polymeric material while limiting cationic transport across the polymeric material.

In embodiments, the binder may be admixed with both the anode active material and the cathode active material. The binder may fully encapsulate the at least one of the anode active material or the cathode active material. The binder and the at least one of the anode active material or the cathode active material may be incorporated in a composite electrode. The polymeric material may be included within the composite electrode at less than or about 10% of the total volume of the composite electrode. The polymeric material may be stable at environmental conditions above or about pH 14.

The present technology also encompasses battery cells that may include a first electrode characterized by a matrix of first particles. The battery cells may also include a second electrode characterized by a matrix of second particles. The battery cells may also include a separator positioned between the first electrode and the second electrode. The battery cells may still further include a polymeric material incorporated in the first electrode. The polymeric material may be characterized by a cationic backbone, and the polymeric material may be configured to selectively provide anionic transport across the polymeric material while limiting cationic transport across the polymeric material. In embodiments, the polymeric material may encapsulate individual first particles of the matrix of the first electrode.

In some embodiments, the battery cells may include a binder coupling the polymeric material with the first particles. The polymeric material may be further incorporated in the second electrode, and the polymeric material may encapsulate individual second particles of the matrix of the second electrode. An amount of polymeric material encapsulating a first particle may be less than about 10% of the volume of the first particle. The polymeric material may be characterized by a conductivity of hydroxide ions of at least about 1 mS/cm.

Such technology may provide numerous benefits over conventional technology. For example, the present devices may reduce dendrite formation and cation diffusion from the electrodes. The present technology may lower resistance within the cell, lower impedance growth, and may increase cycle life over conventional technologies. Additionally, the designs may allow improved water and electrolyte transport within the cell, while limiting metal ion transmission. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIG. 8A shows a schematic view of an electrode according to some embodiments of the present technology.

FIG. 8B shows a schematic cross-sectional view of a portion of an electrode according to some embodiments of the present technology.

FIG. 8C shows a schematic cross-sectional view of a portion of an electrode according to some embodiments of the present technology.

FIG. 8D shows a schematic cross-sectional view of a portion of an electrode according to some embodiments of the present technology.

Figure 1:
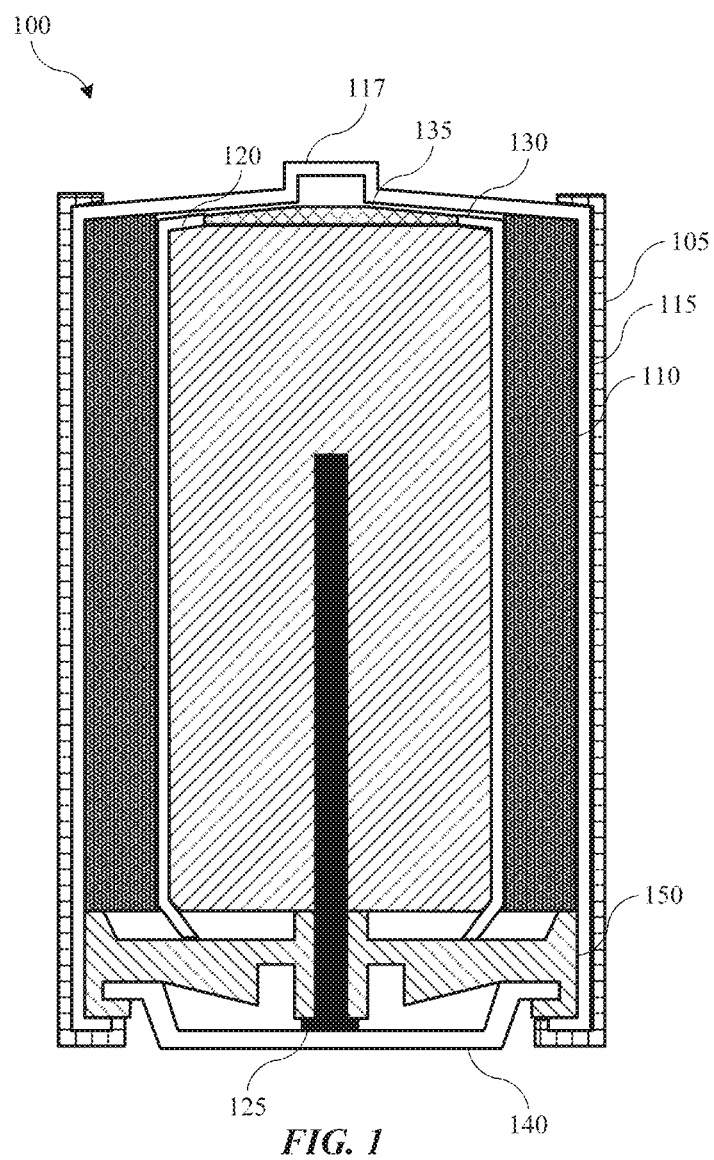
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. For example, alkaline batteries may include electrochemical cells in which the electrolyte may be a concentrated aqueous solution of potassium hydroxide or hydroxides of other Group I or alkali metals. Similar to other battery cell designs, the composite may include a positive electrode and negative electrode with a separator disposed between them to prevent electrical shorting, while allowing electron transport. The separator of many alkaline batteries may be a polymer or cellulosic material. These separators may be porous to allow hydroxide and water transport through the separator. However, because of this porous design, metal ion diffusion through the separator from the electrode materials may also occur. Such diffusion of metal ions may produce a number of issues for the battery life and performance.

For example, metal ions from the anode may dissolve and re-plate in different locations, adjusting the structure of the anode. This may produce a non-uniform electrode structure, and may produce dendrites. These dendrites may extend through the separator and cause short circuits through cells. Additionally, cathode material may dissolve, diffuse through the porous separator, and react at the anode to produce species that degrade the electrode and reduce capacity. Cathode material may also dissolve and re-plate on the anode, which may block access to portions of the electrode and again reduce cell capacity.

Conventional technologies have attempted to resolve these issues by forming thicker separators, which may extend to thicknesses greater than a millimeter or more in some battery designs. Although such a construction may aid in reducing metal ion diffusion, the thicker separator may also affect hydroxide diffusion for the electrolyte, and overall water management within the cell. Additionally, the thicker separator reduces the available volume for electrode active material, which in turn reduces the cell capacity requiring larger overall cells for equivalent capacity. The present technology overcomes these issues by incorporating a polymeric material within the battery cells. The polymeric material may be incorporated in various portions of the cell as discussed in detail below, and they may complement or replace the separator in the cell. The polymeric material functions to reduce, limit, or essentially prevent metal ion distribution between the electrodes, which may aid or resolve the issues discussed above. The polymers may act as a barrier to reduce or prevent metal ion diffusion, while providing a mechanism for hydroxide ions or other anions to move between the electrodes, and allowing water diffusion through the polymeric material. After describing battery and cell designs utilizing the present technology, the disclosure will discuss a variety of embodiments incorporating these polymeric materials in new cell structures.

Although the remaining portions of the description will routinely reference batteries with an alkaline electrolyte, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, electrical grid storage, backup power supplies for facilities such as hospitals, data centers, telecommunications facilities, among others, as well as other applications that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 shows a schematic cross-sectional view of an energy storage device 100 according to embodiments of the present technology. FIG. 1 illustrates a cylindrical battery, which may be an alkaline battery in embodiments. It is to be understood that the battery form is exemplary, and other wound or layered batteries may include similar components including pouch or prismatic cells, which may similarly be used with the present technology. Energy storage device 100 may include an outer casing 105 that contains the components of energy storage device 100. Within outer casing 105 may be a cathode active material 110, which may be in contact with a cathode current collector 115. Cathode current collector 115 may be coupled with an additional conductive element, or may form positive terminal 117 of energy storage device 100. Cathode current collector 115 may be stainless steel, or some other conductive material suitable for electronic transmission. Energy storage device 100 may also include an anode active material 120, which may be in contact with an anode current collector 125.

Anode current collector 125 may form or be coupled with an additional conductive element forming negative terminal 140. Anode current collector 125 may be brass, or some other conductive material suitable for electronic transmission. A separator 130 may be positioned between cathode active material 110 and anode active material 120 to prevent short circuiting between the materials. A portion of separator 130 or a separate insulator 135 may be positioned connected with the separator 130 to further limit contact of the negative anode material 120 with the positive terminal 117. Additionally, an insulator 150 may be positioned between the anode current collector 125 and the cathode active material 110 and the cathode current collector 115. Insulator 150 may be composed of a flexible material to allow gas expansion within the cell during operation.

In embodiments, energy storage device 100 may be an alkaline battery or battery cell, and may include any number of materials associated with such cells. For example, anode active material 120 may include metals or metal-containing material, such as materials including poor metals including group 12, 13, 14, and 15 metals, including aluminum, cadmium, mercury, or zinc, for example. Cathode active material 110 may include materials including transition metals including manganese, nickel, or silver. For example, cathode compounds may include manganese dioxide, including alpha, beta, delta, or gamma manganese dioxide. Exemplary compounds may also include nickel hydroxide, including alpha or beta nickel hydroxide, and nickel oxide hydroxide. Exemplary compounds may also include silver hydroxide, among other metal oxides or hydroxides. Cathode active material 110 may also include a mixture of materials including a carbon-containing material. Separator 130 may include a polymeric material such a polyolefin, including polyethylene or polypropylene. The separator 130 may also include a cellulosic material or a paper. Energy storage device 100 may include a potassium hydroxide electrolyte, which may be a concentrated aqueous solution. Although included as an electrolyte, the potassium hydroxide may not be involved in the cathode and anode reactions, which may produce balanced amounts of hydroxide. Separator 130 may allow hydroxide ions and water to diffuse across the separator 130, while limiting electrical transmission. Because of the porosity of separator 130, cations, such as zinc or manganese ions from the electrodes, may also be transported across the separator 130, which may cause one or more of the issues previously described.

Figure 2:
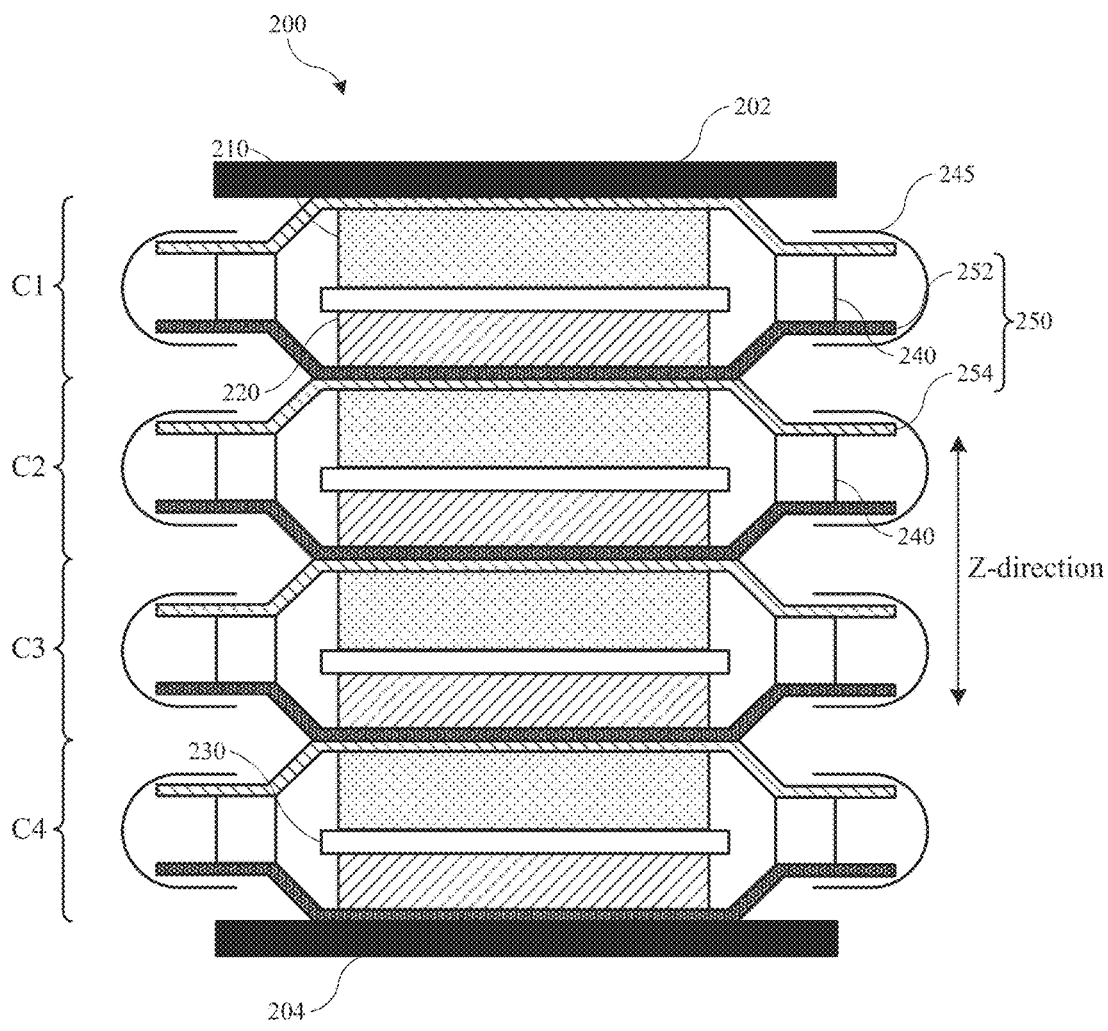
FIG. 2 shows a schematic cross-sectional view of an energy storage device according to embodiments of the present technology.

FIG. 2 depicts a schematic cross-sectional view of another energy storage device according to embodiments of the present technology. The energy storage devices may include a single current collector or coupled current collectors. The energy storage devices may operate in a conventional manner for a stacked battery with regard to electronic flow across or through material layers, such as providing electronic mobility across an xy-plane of the current collectors. Additionally, the described devices may operate by electronic flow through the structure in a z-direction through individual cells as opposed to via tabbed current collectors laterally disposed on the current collectors of conventional batteries.

As illustrated, the stacked battery 200 may include a stack of electrochemical cells C1, C2, C3, and C4 between end plates 202 and 204. End plates 202 and 204 may be metal current collector plates, which can serve both electrical and mechanical functions. In some embodiments, end plates 202 and 204 can be support plates that form part of an external housing of the stacked battery. End plates 202 and 204 may also provide mechanical support within a housing of the stacked battery. Some or all of the support plates may be electrically conductive, and there may be a terminal within the support plate that is electrically connected to the end plate. In embodiments an additional plate similar to end plates 202 and 204 may be disposed within the stack of cells, such as between two cells. This configuration including an additional plate may provide structural rigidity, and the additional plate may also perform electronic functions similar to end plates 202, 204. End plates 202 and 204 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 200, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 210 and an anode 220, where the cathode 210 and anode 220 may be separated by separator 230 between the cathode and anode. Between the anode 220 of cell C1 and the cathode of adjacent cell C2 may be a stacked current collector 250. The stacked current collector 250 may form part of C1 and C2. On one side, stacked current collector 250 may be connected to the seal 240 of C1 and connected on an opposing side to the seal 240 of C2.

In some embodiments, as shown in FIG. 1, stacked current collector 250 may include a first current collector 252 and a second current collector 254. In embodiments one or both of the current collectors may include a metal or a non-metal material, such as a polymer or composite. As shown in the figure, in some embodiments the first current collector 252 and second current collector 254 can be different materials. In some embodiments, the first current collector 252 may be a material selected based on the potential of the anode 220, such as copper or any other suitable metal, as well as a non-metal material including a polymer. The second current collector may be a material selected based on the potential of the cathode 210, such as aluminum or other suitable metals, as well as a non-metal material including a polymer. In other words, the materials for the first and second current collectors can be selected based on electrochemical compatibility with the anode and cathode active materials used.

The first and second metal layers can be made of any material known in the art. For example, copper, nickel, aluminum, or stainless steel may be used, as well as composite materials having metallic aspects, and non-metallic materials including polymers. In some instances the metals used in the first and second metal layer can be the same or different. The materials selected for the anode and cathode can be any suitable materials for that type of battery. In the case of a zinc-manganese oxide alkaline battery cell, the anode material can be, for example, one or more of zinc metal, zinc oxide (ZnO), magnesium (Mg), and aluminum (Al), among other anode materials. The cathode materials in a zinc-manganese oxide alkaline battery cell can be, for example, one or more of electrolytic manganese dioxide (EMD), δ-manganese dioxide, nickel hydroxide, silver oxide, and copper oxide, among other cathode materials. In the case of a lithium-ion battery cell, the anode material can be, for example, one or more of silicon, graphite, carbon, a tin alloy, lithium metal, a lithium containing material, such as lithium titanium oxide (LTO), and other suitable materials that can form an anode in a lithium-ion battery cell. The cathode material in lithium-ion battery cells may include, for example, one or more lithium-containing materials. In some embodiments, the lithium-containing material can be one or more of a lithium metal oxide, such as lithium cobalt oxide, lithium manganese oxide, lithium nickel manganese cobalt oxide, lithium nickel cobalt aluminum oxide, and lithium titanate, while in additional embodiments, the lithium-containing material can include a lithium iron phosphate, and/or other suitable materials that can form a cathode in a lithium-ion battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 3:
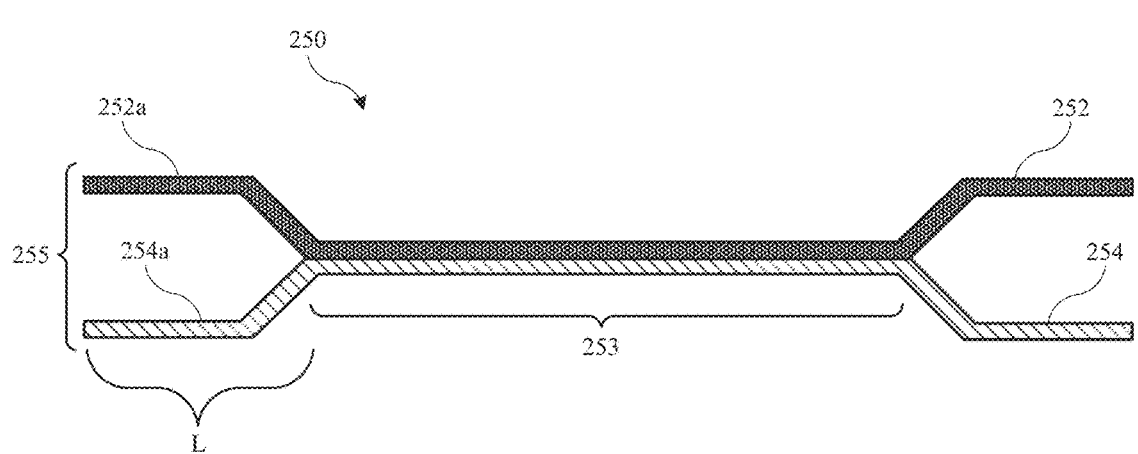
FIG. 3 shows a schematic cross-sectional view of a current collector according to embodiments of the present technology.

Turning to FIG. 3, the stacked current collector 250 may have a connection region 253 where the first current collector 252 and second current collector 254 may be connected, and a gap region 255 at the peripheral ends of the collector 250. In the connection region 253, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 253, the first current collector 252 and the second current collector 254 may be laminated together. Additionally, the connection region 253 may be created by welding the first current collector 252 and the second current collector 254 together. The connection region 253 may also be created by using an adhesive, which may be electrically conductive, between the first current collector 252 and the second current collector 254. In other embodiments, the connection region 253 may be created by the wetting that can occur between the materials of the first current collector 252 and the second current collector 254.

In the gap region 255, the peripheral ends of the first current collector 252 and the second current collector 254 may be spaced apart and moveable relative to each other. As such, there may be a separation distance between the first and second current collectors, which may increase as the electrochemical cell swells. In some embodiments, the spaced apart peripheral ends of the first current collector 252 and the second current collector 254 may be of a length that is sufficient to accommodate an anticipated expansion of the individual electrochemical cells of the stacked battery during cycling of the battery. The peripheral ends of the current collectors 252a and 254a may have a length L, as shown in FIG. 3, which may be long enough that up to or at least about 10% expansion in the z-direction can be accommodated.

As shown in FIG. 2, each cell C1, C2, C3, and C4, also includes a seal 240, which, with the current collector layers, may electrochemically isolate the electrochemical cells from each other. Thus, each cathode-anode pair may be electrochemically sealed and isolated from neighboring electrochemical cells. Because the current collectors 252 and 254 may be separated at the peripheral ends, separate seals 240 can be formed on opposing sides, such as a top and bottom, of the stacked current collector 250. The seals 240 may be the same or different materials, and each seal 240 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 210, the anode 220, and the separator 230 may be preassembled. A first current collector 252 may then be connected to the anode while a second current collector 254 may be connected to the cathode to create a cell. The seal material may be disposed between the first current collector 252 and the second current collector 254 to form seals 240. Finally, the peripheral ends of the sealed electrochemical cell may be further taped to frame the cell. Tapes 245, as well as other coatings, sealing, or material layers, may be disposed around the outer perimeter of the metal layers and seals. The tape 245 may be substituted with ceramic or polymeric materials. Tape 245 may be included for various reasons including to prevent shorting to adjacent layers or to surrounding conductive surfaces within the device, to provide improved electrochemical or chemical stability, and to provide mechanical strength.

FIGS. 2 and 3 illustrate an exemplary stacked battery design according to the present technology. Additional configurations other than illustrated, or as variations on the designs, are also encompassed by the present technology. For example, certain embodiments may not include an additional seal material, and first current collector 252 and second current collector 254 may be directly coupled or bonded together. Additionally, the current collectors may include additional designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1\times10^{-4}$ ohm-m in embodiments. Additionally, exemplary current collectors may have an in-plane and through-plane resistivity of between about $1\times10^{-3}$ ohm-m and about 1,000 ohm-m.

Figure 4:
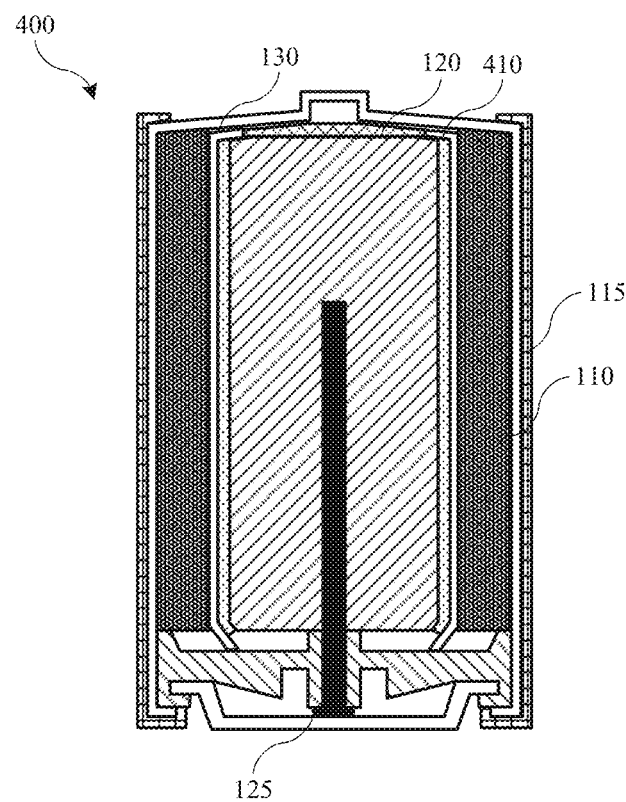
FIG. 4 shows a schematic cross-sectional view of a portion of an energy storage device according to embodiments of the present technology.

Turning to FIG. 4 is shown a schematic cross-sectional view of a portion of an energy storage device 400 according to embodiments of the present technology. As illustrated, energy storage device 400 may include a battery cell, and may include multiple battery cells or batteries similar to those discussed above with regard to FIGS. 1 and 2. Energy storage device 400 is shown as a battery having a single battery cell, but it is to be understood that energy storage devices encompassed by the present technology may include one or more cells up to hundreds or thousands of coupled cells in some multi-cell battery designs. Similar to FIG. 1, energy storage device 400 may illustrate a battery or battery cell, and the cell may include a first current collector 115, which may be the cathode current collector, and a second current collector 125, which may be the anode current collector. As illustrated in FIG. 4, first current collector 115 and second current collector 125 may be a metal current collector, although either current collector may also be a non-metal current collector as previously described with relation to FIG. 2.

The cell of energy storage device 400 may also include electrode components. An anode active material 120 may be disposed on or about, or may contact second current collector 125. Similarly, a cathode active material 110 may be disposed on or contact first current collector 115. Exemplary cells may also include a separator 130 disposed or positioned between anode active material 120 and cathode active material 110. A polymeric material 410 may be coupled with separator 130. Polymeric material 410 is illustrated with a positioning between separator 130 and anode active material 120, but polymeric material 410 may alternatively or additionally be positioned between separator 130 and cathode active material 110 in embodiments. Although illustrated with a cylindrical cell configuration, it is to be understood that polymeric material 410 may be coupled similarly with the separator 230 of energy storage device 200 previously described.

In battery 400, the anode active material 120 may be or include any of the materials previously described in FIGS. 1 and 2, and in embodiments may include zinc or a zinc-containing material. Additionally, cathode active material 110 may be or include any of the materials previously described in FIGS. 1 and 2, and in embodiments may include a manganese-containing material, including an oxide of manganese such as manganese dioxide. Manganese dioxide may be characterized by a number of forms, and may include alpha manganese dioxide, beta manganese dioxide, gamma manganese dioxide, and delta manganese dioxide. The material may also include many of the other elements included in these materials, which may include, for example, lead, potassium, barium, boron, or iron. In some embodiments, the manganese dioxide may be a combination of certain forms of manganese dioxide, and the manganese dioxide may be substantially delta manganese dioxide in embodiments. Energy storage device 400 may also include an electrolyte having alkaline characteristics including a pH of above 7. The electrolyte may include water and potassium hydroxide and may be characterized by a hydroxide ion concentration of up to or about 0.5 M, up to or about 1 M, which may be equivalent to a pH of 14, up to or about 2 M, up to or about 3 M, which may be equivalent to a pH approaching 14.5, up to or about 5 M, up to or about 7 M, up to or about 10 M, which may be equivalent to a pH of 15, or higher.

The separator may be made from one or more types of polymeric materials, including cellulosic polymers and synthetic organic polymers, among other types of polymeric materials. For example, the separator may be made from a polyolefin polymer such as polypropylene and/or polyethylene. Polymeric material 410 may be characterized by a net neutral charge in the bulk, and may be a polymer characterized by a cationic backbone and may include one or more nitrogen-containing moieties in the structure. The backbone may include a hydrocarbon and/or a nitrogen-containing structure, or may include a derivative or benzene, such as styrene, or one or more polyolefin structural segments including one or more nitrogen-containing or other functional groups. Exemplary functional groups or moieties that may be incorporated within the structure include amines or other nitrogen-containing materials, which may be or include imidazole, anilenes, piperidinium, ammoniums, methylated nitrogen, or other nitrogen-containing materials or other non-metal materials, such as phosphoniums. The polymeric material may be configured to provide anionic transport across the polymeric material 410, while limiting cationic transport across the polymeric material.

Exemplary polymers or polymeric materials 410 according to some embodiments of the present technology may include one or more base monomers or materials with which one or more functional groups may be incorporated. For example, base materials may include one or more repeating moieties in any combination, and may include compounds or groups including hydrocarbons including alkanes, alkenes, or alkynes that may be linear, branched, aromatic, and may include, for example polypropylene including unsaturated polypropylene, polyethylene including unsaturated polyethylene, polyphenylene, polystyrene, or other organic groups. The base materials may also include one or more substituted elements including a substituted pnictogen, chalcogen, or halogen, for example. The base materials may include one or more carbonyl or sulfonyl groups. Exemplary base materials may be or include poly(arylene ethers), polyether ketones, polyaryl ether ketones, polyether ether ketone, polyether sulfones, polysulfones that may include cardo, phythalazinone, fluorenyl, or other groups, polyetherimides, polybenzimidazoles, polyether oxadiazoles, polyphenylene oxides, polyvinyl chlorides including polyvinyl benzyl chloride, polyphosphazenes, polyepichlorohydrins, organofluorine compounds including fluorocarbons and perfluorinated materials, hydrofluorocarbons, or other fluoropolymers. Additional materials may be used as the base, which may be characterized by properties similar to any of the noted materials, or other properties which may facilitate hydroxide conduction as explained elsewhere throughout the disclosure.

Coupled with one or more of the base materials may be one or more functional groups, which may extend from a base material, connect multiple base materials or functional groups, or may otherwise be associated with the base materials. The functional group may be characterized by a positive charge, and may include one or more materials including a tetral, pnictogen, chalcogen, or combination of materials, which may also include a metal-containing material, such as a transition-metal-containing cationic group. Exemplary materials may include ammoniums, phosphoniums, sulfoniums, any of which may be or include permanently charged cationic groups such as quaternary cationic compounds. For example, functional groups may include ammoniums including quaternary ammoniums, alkyl-bound ammoniums including benzyl trialkylammoniums, guanidine groups including alkyl or aryl groups, quinuclidine groups including quinuclidine-based quarternary ammoniums, bicyclic, tricyclic, and other heterocyclic ammonium groups, imidazoliums or benzimidazoliums, 1,4-diazabicyclo[2.2.2]octane based groups which may include one or multiple quarternary ammoniums, alkali-stabilized phosphonium groups including quarternary phosphonium groups, phosphorous-nitrogen-containing groups, phosphorous-nitrogen-sulfur-containing groups, metal-nitrogen groups, metal-phosporous groups, as well as combinations of these materials. The functional groups may be characterized by a +1 charge, or may be characterized by a +2 charge, +3 charge, or higher charge.

Also coupled with the base material may be a crosslinker that crosslinks two or more polymers of the base material together. The crosslinker includes two or more reactive groups operable to bond with the base material polymers. For example, a first reactive group of the crosslinker can bond with a reactive counterpart on a first polymer of the base material and a second reactive group of the crosslinker can bond with a reactive counterpart of a second polymer of the base material. Some crosslinkers may include a third, fourth, fifth, etc., reactive group operable to bind with reactive counterparts on additional polymers of the base material. Crosslinking together the polymers of the base material with the crosslinker can mechanically strengthen the polymeric material in applications like a battery separator. On a smaller scale, crosslinking together the polymers of the base material can reduce the size of pores though which ions in the electrolyte migrate between the cathode and anode materials of the battery cell. Because ions like hydroxides and hydrogen ions are significantly smaller than the metal ions generated by the electrode materials (e.g., $Zn(OH)_4^{2-}$, $Mn(OH)_4^{2-}$, $Cu(OH)_4^{2-}$, etc.) crosslinking the polymers of the base material can increase the selectivity of the polymeric material for hydroxide ion transport over transport of the metal ions.

Exemplary crosslinkers for the polymeric materials can include organic crosslinkers such as divinylbenzene, tetramethylguanidine, and 4-tert-butylcatechol-2a, among others. Exemplary crosslinkers for the polymeric materials can also include inorganic crosslinkers such as polyvalent metal oxides like titanium oxide and zirconium oxide, among other inorganic crosslinkers. The crosslinkers may be added in amounts ranging from about 1 wt. % to about 30 wt. % of the base polymer material. Additional exemplary ranges include about 1 wt. % to about 20 wt. % of the base polymer material, about 1 wt. % to about 10 wt. % of the base polymer material, about 5 wt. % to about 30 wt. % of the base polymer material, among other amounts.

The polymeric material 410 may be structured or configured to afford distribution of hydroxide ions and/or water across the polymeric material 410. The polymeric material may also be structured or configured to limit cations or metal ions from passing through the structure. For example, the polymeric material 410 may be configured to limit zinc-containing ions, manganese-containing ions, or other metal-ions of an electrode material from passing through the polymeric material 410. The mechanisms by which hydroxide ions and/or water may pass through the structure may include voids or chain structures that permit permeability of water through the structure, and may permit hydroxide ions to permeate through the polymeric material. In some embodiments, although water may permeate through the polymeric structure, anions and cations from the electrode half reactions may not diffuse through the polymeric structure, and hydroxide ions may be passed across the structure via a different mechanism.

For example, the polymeric material may also include hydroxide ions associated with the polymer structure. The polymeric material may be functionalized to include positively charged groups that may be bonded or associated with the polymeric materials to permit the transmission of hydroxide ions. Transmission of negatively-charged hydroxide ions through the structure may be driven by a chemical, electrical, or physical gradient. For example, as a hydroxide ion interacts with a first outer surface of the polymeric material as they are formed from a first reaction within the battery at one electrode, an internal hydroxide ion within the polymeric material may be dislocated, which may interact with an additional portion of the polymeric material. This interaction may dislocate an additional hydroxide ion, which may continue through the structure until a hydroxide ion is dislocated at a second outer surface of the polymeric material opposite the first outer surface. The released hydroxide ion from the second outer surface may pass through the separator and interact with the opposite electrode. Any number of dislocations may occur, including a single hydroxide release from a second surface opposite a first surface that is contacted by a hydroxide ion.

The polymeric material 410 may be characterized by a number of properties based on its structure. For example, the polymeric material may be stable at pH conditions above 7 within the cell environment, and may be stable at conditions that may be highly basic, and may include pH conditions discussed above based on the electrolyte concentration, which may be up to or greater than a pH of 9, up to or greater than a pH of 10, up to or greater than a pH of 11, up to or greater than a pH of 12, up to or greater than a pH of 13, up to or greater than a pH of 14, up to or greater than a pH of 15, up to or greater than a pH of 16, up to or greater than a pH of 17, up to or greater than a pH of 18, or higher. Exemplary pH ranges include about 14 to about 15, and about 14.5 to about 15.5. among other ranges. The polymeric material 410 may also be characterized by a conductivity for hydroxide ions up to or about 1 mS/cm, and may be characterized by a conductivity for hydroxide ions greater than or about 2 mS/cm, greater than or about 5 mS/cm, greater than or about 10 mS/cm, greater than or about 25 mS/cm, greater than or about 50 mS/cm, greater than or about 75 mS/cm, greater than or about 100 mS/cm, greater than or about 125 mS/cm, greater than or about 150 mS/cm, greater than or about 175 mS/cm, greater than or about 200 mS/cm, or higher. Exemplary hydroxide ion conductivity ranges include about 50 mS/cm to about 200 mS/cm, and about 100 mS/cm to about 200 mS/cm, among other ranges.

The polymeric material 410 may be characterized by a thickness through the polymeric material of less than or about 0.5 mm in embodiments, and may be characterized by a thickness of less than or about 0.25 mm, less than or about 0.20 mm, less than or about 0.15 mm, less than or about 0.10 mm, less than or about 0.07 mm, less than or about 0.05 mm, less than or about 0.03 mm, less than or about 0.01 mm, or less. The polymeric material may retain certain mechanical properties to allow application along manufacturing lines. For example, the polymeric material may be characterized by a tensile or other strength in a machine direction of greater than or about 50 kg/cm$^2$ in embodiments, and may be characterized by a strength in a machine direction of greater than or about 100 kg/cm$^2$, greater than or about 150 kg/cm$^2$, greater than or about 200 kg/cm$^2$, greater than or about 250 kg/cm$^2$, greater than or about 300 kg/cm$^2$, greater than or about 350 kg/cm$^2$, greater than or about 400 kg/cm$^2$, greater than or about 450 kg/cm$^2$, greater than or about 500 kg/cm$^2$, greater than or about 550 kg/cm$^2$, greater than or about 600 kg/cm$^2$, greater than or about 650 kg/cm$^2$, greater than or about 700 kg/cm$^2$, greater than or about 750 kg/cm$^2$, or higher.

The polymeric material may also be characterized by a diffusion ratio of different materials. For example, a diffusion ratio through the polymeric material for water or hydroxide relative to metal ions, such as zinc or manganese, may be greater than 1. The diffusion ratio, such as permeability or diffusion of water or hydroxide as a ratio with the permeability or diffusion of metal ions, may be up to or greater than 10, up to or greater than 100, up to or greater than 1,000, up to or greater than 10,000, up to or greater than 100,000, up to or greater than 1,000,000, or higher, and may be up to 1:0 in which water or hydroxide may permeate the polymeric material, but metal ions cannot pass through the polymeric material. Exemplary diffusion ratios of hydroxide ions relative to metal ions include about 10:1 to about 10,000:1, about 100:1 to about 10,000:1, about 1000:1 to about 10,000:1, among other ranges.

For all materials within a cell structure, the polymeric material may possess selectivities relative to each material. For example, the cationic backbone with anionic incorporation may provide a material characterized by a selectivity for hydroxide ions or anions generally that is higher than the selectivity for zinc cations, manganese cations, or more generally metal cations. Additionally, the materials under operation may produce metal-containing complexes, such as hydroxide complexes, and the selectivity may also extend to these or other metal-containing anions or metal-hydroxide complexes. Selectivity as used may be characterized both chemically and electrically. For example, the selectivity may be associated with ionic conductivity, which may relate to the movement of species across the polymeric material effected by an electric field. Additionally, the selectivity may be defined as a function of permeability and concentration of a particular component of the cell relative to all components of a cell. In many general polymeric membranes, there is a certain amount of tradeoff between selectivity and permeability. Generally more permeable membranes are less selective to various materials, and vice versa.

The present polymeric materials may provide high ion selectivity, defined as a relatively high permeability of hydroxide ions based on a concentration of hydroxide ions, and a relatively low permeability of metal-hydroxide or other anionic metal-complexes cations based on a concentration of metal cations, such as zinc and manganese, for example. Typically, this tradeoff affects water management within the cell as well, but the present polymeric materials may allow water diffusion through the polymeric materials, while limiting ionic transfer through the structure in one or more ways. For example, in some embodiments, permeability through the polymeric material may afford transportation of water and hydroxide ions, while limiting transmission of other ions. In other embodiments, the polymeric material may limit or prevent both anion and cation transmission through the polymeric material. The polymeric material may be characterized with terminal groups or moieties including quarternary ammonium ions with associated hydroxide ions that may migrate towards one electrode or the other during charging or discharging operations.

The selectivity may additionally be related to pore and permeation path diameters across the membrane. For example, the polymeric material may be characterized by the capability of transporting ions of a certain size or diameter. It is to be understood that by diameter is meant a distance across a molecule or ion in any direction, as many materials may not be characterized by spherical geometries. The polymeric material may be characterized by the capability of transporting materials characterized by a diameter of less than or about 50 nm, while limiting or preventing the transmission of materials characterized by a larger diameter. The polymeric material may also be characterized by the capability of transporting materials characterized by a diameter of less than or about 45 nm, less than or about 40 nm, less than or about 35 nm, less than or about 30 nm, less than or about 25 nm, less than or about 20 nm, less than or about 15 nm, less than or about 10 nm, less than or about 9 nm, less than or about 8 nm, less than or about 7 nm, less than or about 6 nm, less than or about 5 nm, less than or about 4 nm, less than or about 3 nm, less than or about 2 nm, less than or about 1 nm, less than or about 0.5 nm, less than or about 0.3 nm, or less, while limiting or preventing transmission of materials characterized by a larger diameter.

A limitation of conventional separator materials, as explained above, is that as thickness of the separator increases to reduce ionic diffusion, capacity of the device may reduce as the volume for active materials is reduced. The present polymeric materials, however, may allow the separator to be reduced in thickness because of the ability of the polymeric material to reduce, limit, or prevent metal ions from traversing across the separator. In this way, the separator may be reduced in thickness compared to conventional separators, and in some embodiments may be removed from the system. In cells including the polymeric material 410, the separator may be less than 0.25 mm in thickness, and may be less than or about 0.20 mm, less than or about 0.15 mm, less than or about 0.10 mm, less than or about 0.07 mm, less than or about 0.05 mm, less than or about 0.03 mm, less than or about 0.01 mm, or less.

Certain conventional alkaline batteries may utilize paper or separators within some of these ranges, but the separators may work only with non-rechargeable battery designs. When cycling of such batteries is attempted, dendrites of zinc or other issues discussed above may occur when charging is performed. These dendrites may penetrate conventional separators, and cause a short within the cell. Alternatively, separators of these dimensions would allow metal ions to pass through the structure, which may affect cycling capability and capacity of the battery. Accordingly, such batteries may only be capable of cycling less than 20 times with continuing capacity degradation until they are irreversibly depleted, and may be capable of cycling less than 10 times, less than 5 times, or less before damage to the cell structure occurs. The present technology, however, may utilize separator materials of the dimensions discussed above while providing hundreds or thousands of use cycles. This may be due to the polymeric materials that may limit or prevent metal ions from crossing from one electrode to another, or from forming dendrites or re-forming in different geometries across the electrode. In this way, more space within a structure may be occupied by electrode material, while improving management and control of the electrode materials, which may additionally improve recharging capacity and life cycle.

Figure 5:
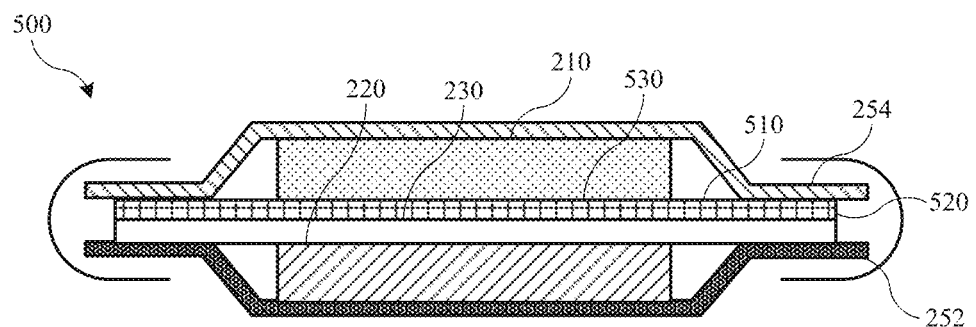
FIG. 5 shows a schematic cross-sectional view of a portion of an energy storage device according to embodiments of the present technology.

Turning to FIG. 5 is shown a schematic cross-sectional view of a portion of an energy storage device 500 according to embodiments of the present technology. Energy storage device 500 may be similar to energy storage device 200 discussed above, and may include similar components. For example, energy storage device 500 may include a first current collector 252, and a second current collector 254. An anode active material 220 may be disposed on or in contact with first current collector 252, and a cathode active material 210 may be disposed on or in contact with second current collector 254. The current collectors and active materials may be any of the materials discussed above with regard to FIG. 2. A separator 230 may be disposed between the anode active material 220 and the cathode active material 210. A polymeric material 510 may be disposed on one or more surfaces of the separator 230. Polymeric material 510 is illustrated as positioned between the cathode active material 210 and the separator 230, but it is to be understood that polymeric material 510 may additionally or alternatively be positioned between the anode active material 220 and the separator 230. Polymeric material 510 may be characterized by any of the properties of polymeric material 410 discussed above with respect to FIG. 4. Additionally, in other embodiments, polymeric material 510 may act as a separator of the energy storage device alone, and an additional separator 230 may not be included within the cell structure.

As illustrated, polymeric material 510 and separator 230 may be utilized to form a complete seal between the first current collector 252 and the second current collector 254, which may obviate seal 240 discussed above. An amount of polymeric material 510 may be bonded, fused, or coupled with one or both current collectors, when polymeric material 510 is located on both sides of separator 230. This coupling may form a complete barrier to migration around the separator reducing cell performance, which may occur in some conventional cells, including prismatic cells. Polymeric material 510 may be bonded or coupled with one or both current collectors with an adhesive or may be heat sealed to the current collector to form a liquid seal or hermetic seal between the polymeric material 510 and the current collector with which it is coupled. The seal may be formed at a lateral region 520 of the polymeric material 510 towards an edge region of the polymeric material, while active materials within the cell may contact a medial region 530 of the polymeric material.

Figure 6:
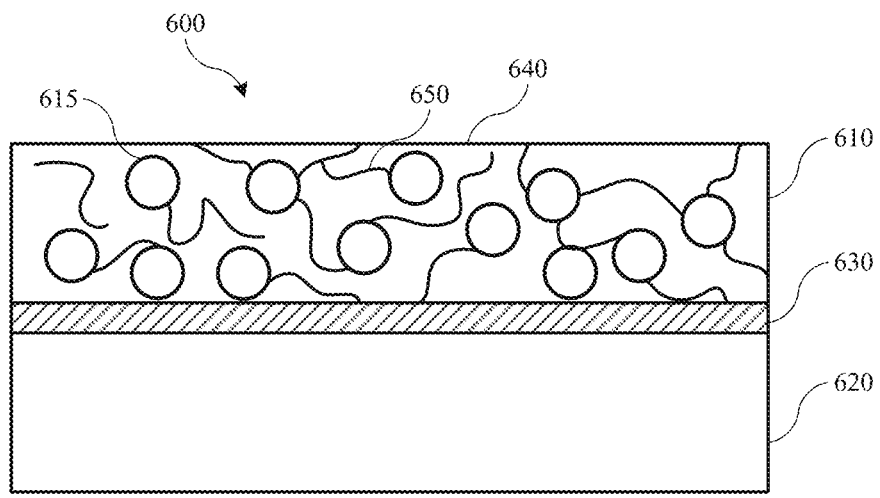
FIG. 6 shows a schematic cross-sectional view of a portion of a battery cell according to embodiments of the present technology.

Turning to FIG. 6 is shown a schematic view of a portion of a battery cell 600 according to embodiments of the present technology. Battery cell 600 may be incorporated in any of the previously described batteries or cell structures, and may include any of the components, materials, or properties previously discussed. Battery cell 600 may illustrate an exemplary cathode active material 610 and an exemplary anode active material 620. Positioned between and electrically separating the two active materials may be a separator 630. Separator 630 may be a conventional separator including a polymeric, cellulosic, or paper separator, and may be a polymeric material as described previously. Although current collectors are not described, any of the previously described current collectors may be utilized with battery cell 600. In some embodiments utilizing components of cell 600, a polymeric material 650 as discussed previously may not be associated with the separator as illustrated, but may instead be incorporated within a binder 640 of the present technology.

The cathode of battery cell 600 is illustrated as having particles 615 distributed within a binder material 640 to produce cathode active material 610. The binder 640 may be admixed with at least one of the anode active material and/or the cathode active material. Although battery cell 600 is illustrated with binder 640 incorporated within the cathode structure, it is to be understood that binder 640 may be included additionally or alternatively with anode active material 620, and in some embodiments, binder 640 including polymeric material 650 may be admixed with both the anode active material 620 and the cathode active material 610. Binder 640 may include a polymeric material 650 as previously described, which may, for example, be configured to selectively provide anionic transport across the polymeric material 650 while limiting cationic transport across the polymeric material 650. The polymeric material 650 may be the majority component within the binder 640, and may be functionalized or formed to be the binder 640 in embodiments.

Binder 640 and polymeric material 650 may be configured to fully encapsulate the particles of the associated active materials within the electrode. In this way, the polymeric material may prevent metal cation material from distributing out of cathode active material 610, and through separator 630. Separator 630 can then be limited in nature to a more porous membrane, while still producing a cell that may have reduced effect from dendritic growth or electrode material transfer, and may allow improved cycling capability. A thinner separator may also provide additional volume within a cell for active material, which may increase cell capacity for a given form factor.

Although illustrated with limited particles 615, battery cell 600 may show an exaggerated view for the purpose of illustration. Exemplary cells of the present technology may include a limited amount of binder to provide a maximum amount of conductive material within the active material of each electrode to provide capacity. The active particles, binder, polymeric material, and any additional binder or other additive or component may produce a composite electrode incorporating each of these materials. The amount of polymeric material within the composite electrode may be less than 20% of the total volume of the composite electrode in embodiments, and may be less than or about 15% of the volume, less than or about 12% of the volume, less than or about 10% of the volume, less than or about 7% of the volume, less than or about 5% of the volume, less than or about 3% of the volume, less than or about 1% of the volume, or less. The amount of binder and associated polymeric material within the binder may be an effective amount to fully encapsulate the active material particles. Battery cell 600 may demonstrate an additional structure capable of incorporating a polymeric material within a cell to provide the benefits discussed throughout this disclosure.

Figure 7:
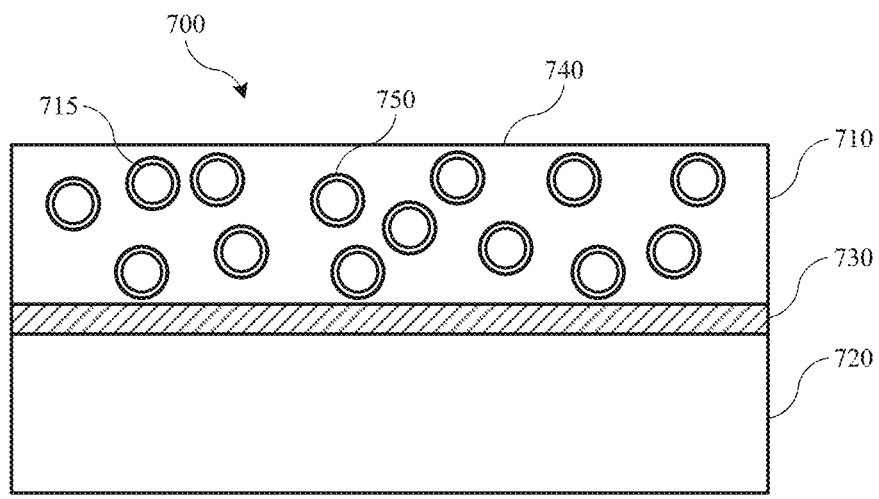
FIG. 7 shows a schematic cross-sectional view of a portion of a battery cell according to embodiments of the present technology.

FIG. 7 shows a schematic cross-sectional view of a portion of a battery cell 700 according to embodiments of the present technology. Battery cell 700 may be incorporated in any of the previously described batteries or cell structures, and may include any of the components, materials, or properties previously discussed. Battery cell 700 may illustrate an exemplary cathode active material 710 and an exemplary anode active material 720. Positioned between and electrically separating the two active materials may be a separator 730. Separator 730 may be a conventional separator including a polymeric, cellulosic, or paper separator, and may be a polymeric material as described previously. Although current collectors are not described, any of the previously described current collectors may be utilized with battery cell 700. In some embodiments utilizing components of cell 700, a polymeric material 750 as discussed previously may not be associated with the separator or binder as illustrated, but may instead encapsulate individual particles of electrode active material.

The cathode of battery cell 700 is illustrated as having particles 715 distributed within a binder material 740 to produce cathode active material 710. The electrode may be characterized as having a matrix of first particles, which as illustrated may be cathode particles. Anode 720 may also be characterized by a matrix of anode particles or second particles, which may be the same or different from the first particles, and either particles may include any of the materials previously described, or some combination. The individual particles of the electrode may be encapsulated in a polymeric material 750. The polymeric material 750 may be incorporated with both the anode active material and cathode active material and may be used to encapsulate particles of either electrode. Although battery cell 700 is illustrated with polymeric material 750 incorporated within the cathode structure, it is to be understood that polymeric material 750 may be included additionally or alternatively with anode active material 720, and in some embodiments, polymeric material 750 may be utilized to encapsulate the individual particles of both the anode active material 720 and the cathode active material 710.

The polymeric material 750 may be any of the polymeric materials previously described, which may, for example, be characterized by a cationic backbone. The polymeric material 750 may also be configured to selectively provide anionic transport across the polymeric material 650 while limiting cationic transport across the polymeric material 650. A binder may be used in addition to the polymeric material 750 to assist or enable polymeric material 750 to fully encapsulate the individual particles 715. The binder may be any conventionally used binder, or may be specifically formulated to enable binding of the polymeric materials previously described with metal materials previously described.

Although illustrated with limited particles 715, battery cell 700 may also show an exaggerated view for the purpose of illustration. Exemplary cells of the present technology may include a limited amount of polymeric material 750 to provide a maximum amount of conductive material within the active material of each electrode to increase capacity within a given volume for the cell components. The amount of polymeric material encapsulating each individual particle may be less than 20% of the volume of the individual particle the polymeric material is encapsulating, and may be less than or about 15% of the volume, less than or about 12% of the volume, less than or about 10% of the volume, less than or about 7% of the volume, less than or about 5% of the volume, less than or about 3% of the volume, less than or about 1% of the volume, or less. The amount of polymeric material encapsulating the particle may be an effective amount to fully encapsulate the individual particle without producing voids in the coverage. By encapsulating each particle, the structure may prevent any of the metal distribution or reconfiguration previously discussed. The polymeric material may allow hydroxide transfer, while limiting or preventing movement of the zinc or manganese, or other metal materials or oxides, which may control dendrite growth and may maintain the geometry of each particle during charging and discharging. Accordingly, cells utilizing this structure or any of the previously described structures may provide improved cycling, battery life, and capacity over conventional cells and structures.

FIG. 8A shows a schematic view of an electrode 800 according to some embodiments of the present technology. Electrode 800 may include a current collector 805 and a polymeric material 810 that may extend across or about an electrode active material. The polymeric material may optionally be formed as a pouch about the electrode material. In some embodiments, the polymeric material may include two films encompassing the electrode as a pouch or other complete enclosure about the electrode active material. The polymeric material may be characterized by any number of profiles, and may extend up towards or across the electrode tab, incorporating optional region 808 illustrated by a hatched line. In some embodiments including a pouch design, the separate polymeric material films may be coupled together to form a seal by heat treatment, pressure treatment, or any additional coupling by which the two films may be formed about the electrode and current collector. In some embodiments the polymeric material films may contact one another along all edge surfaces or edges except for along a tab region extending from the current collector. Accordingly, in a pouch configuration, the polymeric film material may be incorporated and/or sealed within exterior materials, including an external pouch encompassing the cell or cells. The current collector 805 may be characterized by any of the shapes or materials previously described, and as illustrated may include a current collector tab as illustrated, or may not depending on the battery cell configuration in which the current collector may be included. For example, the current collector may also be a pin or protrusion design similar to current collector 125 previously discussed. Accordingly, FIG. 8A illustrates an exemplary electrode design according to some embodiments, and which may be adjusted to accommodate any of the other cell designs encompassed by the present technology.

FIG. 8B shows a schematic cross-sectional view along line A-A of a portion of electrode 800 illustrated in FIG. 8A, and according to some embodiments of the present technology. Electrode 800 may include any of the materials previously described, and may include a polymeric material 810 as described above. Electrode 800 may be an anode or a cathode electrode, and may include a current collector 805 about which an active material 815 may be disposed, and which may be an anode or a cathode active material. The current collector may include active material disposed on opposite surfaces as well as fully about the current collector as illustrated. For example, active material may be disposed on a first surface and/or a second surface opposite the first surface, or may fully or partially extend about lateral edges of current collector 805 as illustrated. The current collector may be any of the previously noted current collectors or materials, and may be characterized by a number of designs including a continuous or perforated material, such as a mesh, for example.

The active material 815 may be formed about the current collector to any thickness, and may be incorporated in any of the battery cell configurations previously noted. Polymeric material 810 may include any of the formulations previously described, and may be coated about active material 815 to partially, substantially, or fully encapsulate the active material, or produce a seal or barrier about the active material 815. Polymeric material 810 may also be incorporated within the electrode active material as previously discussed. The encapsulation of active material 815 may limit dendritic groups from the active material, and may facilitate hydroxide transmission as discussed above.

FIG. 8C shows another schematic cross-sectional view along line A-A of a portion of electrode 800 illustrated in FIG. 8A, and according to some embodiments of the present technology. FIG. 8C may include similar components to FIG. 8B as discussed above, and may include a current collector 805, an electrode active material 815, and a polymeric material 810. The configuration illustrated in FIG. 8C may diverge from the configuration illustrated in FIG. 8B in formation of the active material on the current collector. For example, as illustrated in FIG. 8C, active material 815 may be formed on opposite sides of a current collector 805, and may not extend fully about current collector 805. Yet another embodiment encompassed by the present technology may include the active material disposed on a single surface of the current collector.

Polymeric material 810 may be formed about the electrode 800 similar to with the configuration of FIG. 8B, and may at least partially encapsulate the active material 815, and in some embodiments may substantially or completely encapsulate the active material 815. In some embodiments as illustrated, polymeric material 810 may extend about lateral edges of the current collector, which may be otherwise exposed relative to the active material. Accordingly, polymeric material 810 may extend along any exposed surface of the active material and continue along the current collector to form a complete barrier layer about a region of the current collector on which the active material may reside.

FIG. 8D shows a schematic cross-sectional view along line B-B of a portion of electrode 800 illustrated in FIG. 8A, and according to some embodiments of the present technology. As shown, polymeric material 810 may extend towards a tab region of the current collector, or may extend longitudinally along the current collector to ensure coverage of an edge region of the active material. The application may be performed in any number of ways to allow coating about exposed surfaces of an electrode active material. For example, any known coating processes, including spray coating, slot die coating, or dip coating, for example, may be used to perform the coating process. In an exemplary dip coating process, a current collector on which an active material may be disposed may be extended within a flowable polymeric material to produce a coating or encapsulation layer about the active material. The degree of extension within the polymeric material may, for example, determine the longitudinal extension of polymeric material past an edge of the active material and along the current collector.

Polymeric material 810 may be made flowable by an application of heat and/or use of a solvent, which may produce a flowable form of polymeric material 810. For example, any suitable solvent may be included, although in some embodiments solvents characterized by relatively low evaporation temperatures may be used, such as n-propanol, isopropanol, methanol, N-methyl-2-pyrrolidone, 1-methoxy-2-propanol, or other solvents, which may provide a flowable form of the polymeric material, and which may be coated about the electrode. In solution, the polymeric material may be up to 90% by weight of the solution with a solvent, although in some embodiments the polymeric material may be less than or about 90% relative to the solvent, less than or about 80%, less than or about 70%, less than or about 60%, less than or about 50%, less than or about 40%, less than or about 30%, less than or about 20%, less than or about 15%, less than or about 10%, less than or about 5%, less than or about 4%, less than or about 3%, less than or about 2%, less than or about 1%, or less.

Depending on the viscosity produced for the application or the desired thickness of coating, one or more coats of the polymeric material may be applied in some embodiments to produce a predetermined thickness of the polymeric material, or to ensure a more complete coverage of the active material. For example, the coating may be applied to develop a thickness over a single dip-coating operation, or may include at least about 2, at least about 3, at least about 4, at least about 5, or more coatings to develop a particular thickness. The thickness of the polymeric material may be any of the thicknesses previously described, and may be developed based on a number of applications or coating layers, for example. Between dipping or other application cycles, the electrode with a layer of polymeric material may be held for a period of time to allow degassing from the solution, including for air bubbles to be removed from an individual layer. The period of time may be greater than or about 1 second, and in some embodiments may be greater than or about 5 seconds, greater than or about 10 seconds, greater than or about 15 seconds, greater than or about 20 seconds, greater than or about 25 seconds, greater than or about 30 seconds, or more.

Once applied, or between application cycles, the polymeric material may be dried by any number of means including air drying such as by hanging in an ambient environment, including an inert environment including nitrogen or argon, heat drying or baking in which the polymeric material may be maintained at a temperature above or about 20° C., and may be maintained above or about 30° C., above or about 50° C., above or about 75° C., above or about 100° C., above or about 120° C., above or about 140° C., above or about 160° C., above or about 180° C., above or about 200° C., above or about 220° C., above or about 240° C., or higher, or other techniques that may remove all or some residual solvent before additional manufacturing operations may be performed. The drying may be performed for an amount of time to enable removal of solvent from the system, and may be performed for greater than or about 1 minute. In some embodiments, the drying may be performed for greater than or about 2 minutes, greater than or about 5 minutes, greater than or about 7 minutes, greater than or about 10 minutes, greater than or about 12 minutes, greater than or about 15 minutes, greater than or about 18 minutes, greater than or about 20 minutes, or more. After a final layer of polymeric material has been applied, some embodiments may perform an additional drying operation that may last greater than or about 1 hour, greater than or about 3 hours, greater than or about 6 hours, greater than or about 8 hours, greater than or about 10 hours, greater than or about 12 hours, or longer to complete drying of the polymer material, or composite of polymeric material.

An additional operation may be performed subsequent the application of the polymeric material. For example, in some embodiments a post-treatment operation may be performed to condition or treat applied polymeric material. The treatment may include a compression or other crosslinking operation that may include an application or heat, pressure, crosslinker, or other operation to further conform the polymeric material about the electrode active material. For example, a treatment may be performed at any of the previously noted temperatures, and may be performed at a pressure of greater than or about 1 MPa. In some embodiments, the pressure or compression may be greater than or about 5 MPa, greater than or about 10 MPa, greater than or about 15 MPa, greater than or about 20 MPa, greater than or about 25 MPa, greater than or about 30 MPa, greater than or about 35 MPa, greater than or about 40 MPa, greater than or about 45 MPa, greater than or about 50 MPa, or greater. Additionally, or alternatively, a thermal crosslinking operation may be performed in which the composite or electrode with polymeric material may be housed within an environment characterized by an increased temperature for greater than or about 10 minutes, greater than or about 20 minutes, greater than or about 30 minutes, greater than or about 40 minutes, or more. The temperature may be any of the previously stated temperatures, and may be greater than or about 150° C., or more, for example.

Figure 9:
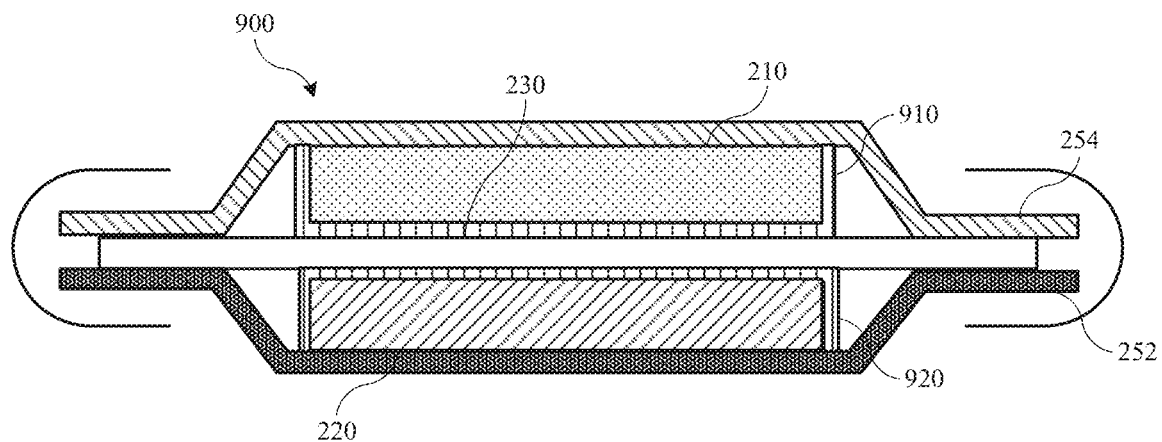
FIG. 9 shows a schematic cross-sectional view of a portion of a battery cell according to some embodiments of the present technology.

FIG. 9 shows a schematic cross-sectional view of a portion of a battery cell 900 according to some embodiments of the present technology, and may illustrate an alternative cell including a coated electrode discussed previously. Battery cell 900 shows an exemplary stacked design, which may include any of the features previously discussed, such as with FIG. 5, for example, although any of the materials or properties discussed previously may be included with the battery cell. Battery cell 900 may include a first current collector 252 on which an anode active material may be disposed, and may also include a second current collector 254 on which a cathode active material may be disposed. In some embodiments a separator 230 may be positioned between the anode and cathode active materials.

A polymeric material may also be incorporated within the cell, and may be formed, deposited, or positioned about one or both of the anode active material 220 or the cathode active material 210. For example, a first polymeric material 910 may extend about an outer surface, which may include outer edges, of cathode active material 210, and may cover all surfaces of cathode active material 210 that are not in contact with second current collector 254. Additionally or alternatively, a second polymeric material 920 may extend about an outer surface, and which may include outer edges, of anode active material 220. In some embodiments, second polymeric material 920 may coat or cover all surfaces of anode active material 220 that are not in contact with first current collector 252. Polymeric materials 910, 920 may be or include any of the materials described above, and each polymeric material may be the same, or polymeric material 910 may be different from polymeric material 920 in some embodiments. By encompassing or encapsulating the active material against and/or about the current collector, the polymeric materials 910, 920 may not extend to a seal region of the battery cell 900 as illustrated in other encompassed configurations described previously. Accordingly, an edge thickness in a stacked configuration, which may include many cells, may be less than configurations for which the polymeric material may fully extend across the separator.

Figure 10:
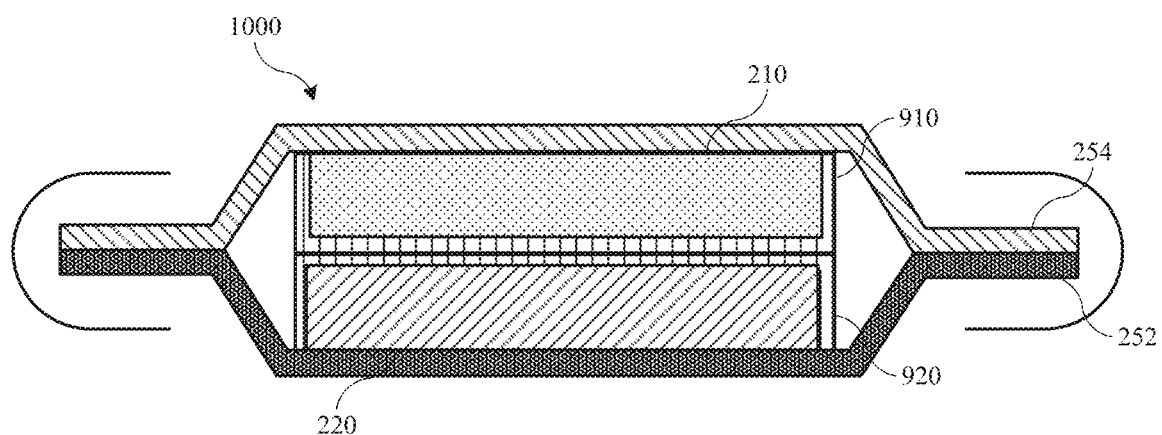
FIG. 10 shows a schematic cross-sectional view of a portion of a battery cell according to some embodiments of the present technology.

In some embodiments where the active materials may be fully encompassed or coated with polymeric material, and depending on some of the characteristics of the polymeric material as described above, a separator may not be included in the cell design where a polymeric material may produce a barrier for the electrode active materials. FIG. 10 shows a schematic cross-sectional view of a portion of a battery cell 1000 according to some embodiments of the present technology, which may not include a separator extending across the cell between the anode active material and cathode active materials.

Battery cell 1000 may include any of the components or characteristics previously described, and in some embodiments battery cell 1000 includes a first current collector 252 on which an anode active material 220 may be disposed. Battery cell 1000 may also include a second current collector 254 on which a cathode active material 210 may be disposed. Extending about each of the anode active material 220 and the cathode active material 210 may be a polymeric material. Polymeric material 910 may extend about an outer surface and side surfaces of cathode active material 210, and may fully coat cathode active material 210 on any surface not in contact with current collector 254. Similarly, polymeric material 920 may extend about an outer surface and side surfaces of anode active material 220, and may fully coat anode active material 220 on any surface not in contact with current collector 252.

The polymeric materials 910, 920 may be coupled together during battery cell 1000 assembly to allow ionic transport between the two active materials. Although a division is illustrated between the two polymeric materials 910, 920, in some embodiments a coupling operation may include heat or residual solvents allowing a solubility between the two polymeric materials, which may then produce a continuous construct between the anode active material and the cathode active material. Because the polymeric materials may fully insulate the anode active material and cathode active material, an additional separator, such as separator 230 described previously may not be included in some embodiments. The polymeric materials may operate to shuttle hydroxide between the two electrodes during charging and discharging operations. The polymeric materials may be characterized by any of the thicknesses previously described, although in some embodiments where a separator may not be included, the polymeric materials may be characterized by an increased thickness to ensure complete coverage of the active materials and limit opportunity for contact between the active materials. By removing a separator from the battery cell, in some embodiments where polymeric current collectors may be used, the current collectors may be directly sealed together, such as along edge regions that may be of reduced or negligible conductivity. In other embodiments a spacer or insulator may be positioned between the distal edges to prevent direct contact where a possibility of shorting may exist, depending on the current collector compositions. By removing a separator from each individual cell, overall cell thicknesses may be reduced, allowing improved density of composite configurations including multiple cells.

EXPERIMENTAL

The choice of functional groups used to functionalize the polymeric material that separates the cathode and anode materials while permitting the conduction of hydroxide ions between cathode and anode electrodes can have significant effects on battery stability. This stability was measured by recording the number of discharge cycles it took for a Zn/MnO$_2$ alkaline battery cell having a separator made of polymeric material that included a particular functional group to reach 80% of its initial discharge capacity. The battery cell included a zinc (Zn) anode half-cell and manganese oxide (MnO$_2$) half-cell separated by an ion-selective separator made from polymeric material that included a polyvinyl benzyl chloride backbone polymer functionalized with a functional group that was tested to measure the overall stability of the battery cell.

The stability measurements were conducted by measuring an initial discharge capacity of the battery cell and then measuring the reduction in capacity per cycle over a series of charge/discharge cycles for the battery cell. The number of charge/discharge cycles needed for the battery cell to reach 80% of its initial discharge capacity was recorded for each functional group used to functionalize the polymeric material used in the battery cell's separator. For example, if the initial discharge capacity of the battery cell was 325 mAh/g and the battery cell's discharged dropped to 260 mAh/g (i.e. 80% of initial capacity) after 20 charge/discharge cycles, the stability of the battery cell would be recorded as 20 cycles.

Figure 11:
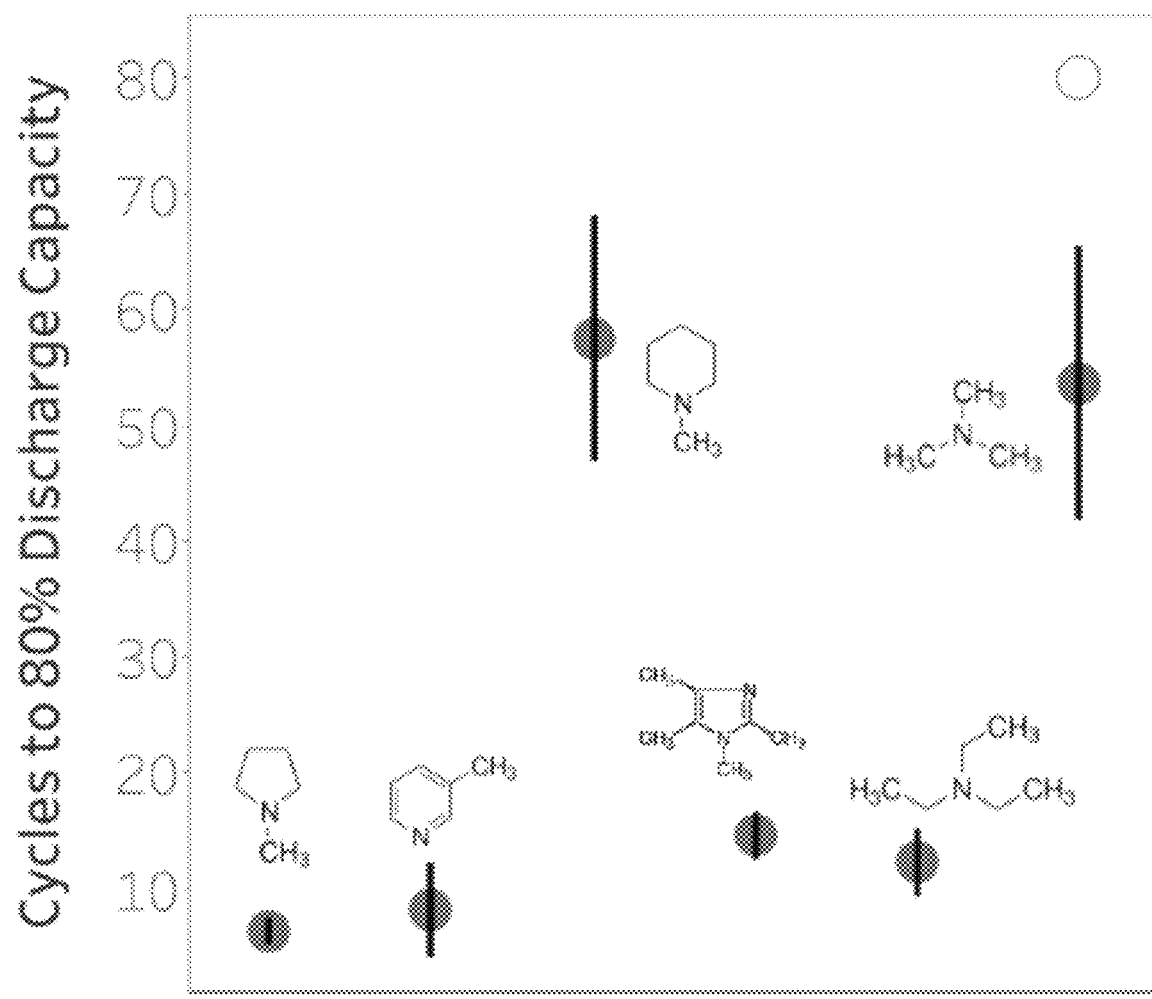
FIG. 11 shows a plot of battery cell stability for different functional groups functionalizing the polymeric material of the battery cell's separator.

As shown in the plot of FIG. 11, two functional groups showed a stability that was significantly greater than the other four functional groups tested. Specifically, the number of discharge cycles to reach 80% of initial discharge capacity ranged between 50 to 60 cycles for polyvinyl benzyl chloride functionalized with N-methylpiperidine or trimethyl amine, while polyvinyl benzyl chloride functionalized with N-methylpyrrolidine, 2-methylpyridine, or triethyl amine reach the 80% capacity threshold in only 5 to 15 discharge cycles. In other words, polyvinyl benzyl chloride that was functionalized with N-methylpiperidine or trimethyl amine demonstrated stability that was five to six times greater than polyvinyl benzyl chloride functionalized with N-methylpyrrolidine, 2-methylpyridine, or triethyl amine.

The magnitude of the differences in stability for functional groups with many structural similarities demonstrates the unpredictability nature of these polymeric materials in the extreme conditions of an alkaline battery, where the aqueous electrolyte has a pH that typically ranges between 14 and 15. When the electrode and polymeric materials are subjected to these conditions, an environment is created where polyvinyl benzyl chloride functionalized with trimethyl amine has five to six times the stability (as measured by the number of discharge cycles to lose 20% of initial capacity) of the structurally similar triethyl amine. Similarly, the alkaline battery environment produces polyvinyl benzyl chloride functionalized with N-methylpiperidine that is more than six times as stable as polyvinyl benzyl chloride functionalized with structurally similar N-methylpyrrolidine. These unexpected results for the functionalized polymeric membranes in alkaline battery cells were only discovered through empirical testing of the stability on a number of functionalized polymeric membranes.

Figure 12:
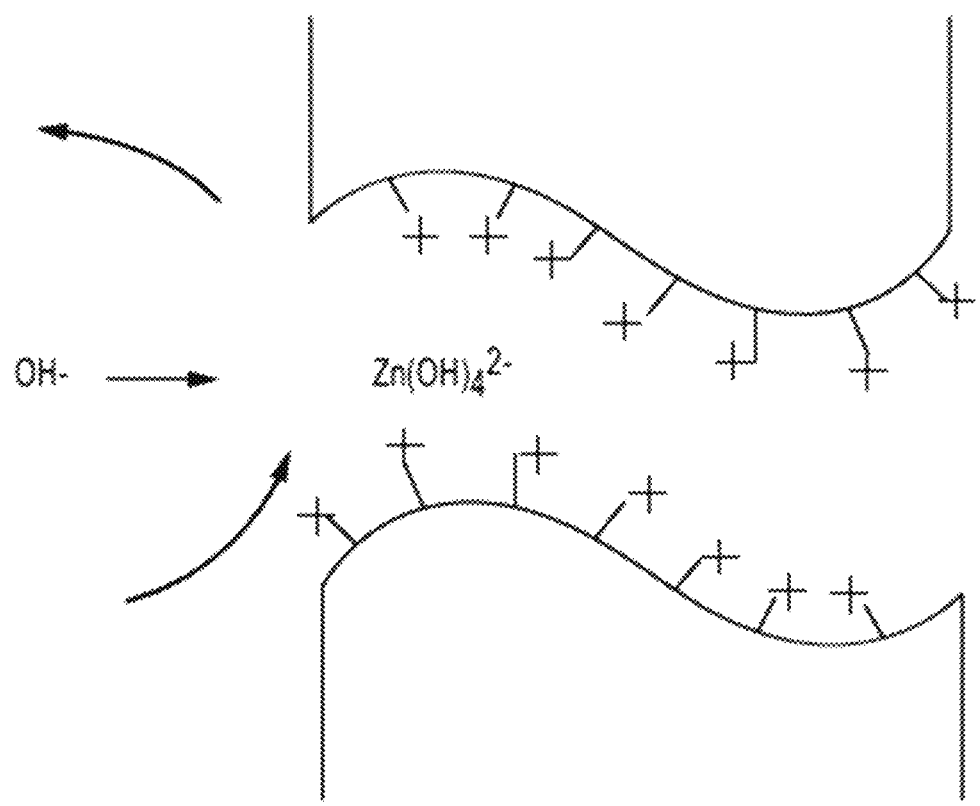
FIG. 12 shows a simplified schematic representation of a zinc hydroxide anion reversibly binding to a hydroxide ion channel in a functionalized polymeric material according to some embodiments of the present technology.

While the application should not be limited to a particular explanation of how the functional groups affect the stability of the battery cell, it is believed that the functional group plays a role in how strongly soluble metal ions from the electrode materials bind and block the hydroxide ion channels in the polymeric materials. As illustrated in FIG. 12, functional materials that reduce the bonding strength of metal ions such as Zn(OH)$_4^{2-}$ released from the zinc anode prevent these metal ions from permanently blocking a hydroxide ion channel and reducing the overall permeability of the separator to hydroxide ion transmission with each additional charge/discharge cycle of the batter cell. It is believed that a combination of steric and electrostatic effects make functional groups like N-methylpiperidine and trimethyl amine particularly effective at reversibly binding metal ions like Zn(OH)$_4^{2-}$ under the extreme alkaline conditions of the electrolyte.

The experimental results indicate that the selection of functional group is a significant determinant in the stability of an alkaline battery cell. Functional group selection and other factors permit secondary alkaline battery cells with a reduction of 10% or less in the initial capacity after 50 charge/discharge cycles, 60 charge/discharge cycles, 70 charge/discharge cycles, 80 charge/discharge cycles, 90 charge/discharge cycles, and 100 charge/discharge cycles, among other charge/discharge thresholds.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery comprising:
   a cathode material;
   an anode material;
   a liquid electrolyte; and
   a polymeric material separating the cathode material from the anode material,
   wherein the polymeric material comprises polyvinyl benzyl chloride functionalized with an N-methylpiperidine group or a tetramethyl imidazole group, and wherein the polymeric material has a hydroxide ion conductivity of at least about 50 mS/cm, and a diffusion ratio of hydroxide ions to at least one type of metal ion of at least about 10:1.

2. The battery of claim 1, wherein the polymeric material has a hydroxide ion conductivity ranging from about 50 mS/cm to about 200 mS/cm.

3. The battery of claim 1, wherein the diffusion ratio of hydroxide ions to the at least one type of metal ion ranges from about 10:1 to about 10,000:1.

4. The battery of claim 1, wherein the at least one type of metal ion includes a zinc ion.

5. The battery of claim 1, wherein the battery has a capacity reduction of less than about 10% after 50 charge/discharge cycles.

6. The battery of claim 1, wherein the battery has a capacity reduction of less than about 10% after 100 charge/discharge cycles.

7. The battery of claim 1 wherein the cathode material comprises manganese dioxide.

8. The battery of claim 1, wherein the anode material comprises zinc.

9. The battery of claim 1, wherein the battery further comprises an electrolyte with a pH of about 14 to about 15.

10. The battery of claim 9, wherein the electrolyte comprises aqueous potassium hydroxide.

11. The battery of claim 1, wherein the polymeric material further comprises a crosslinker.

12. The battery of claim 11, wherein the crosslinker comprises at least one of divinylbenzene, tetramethylguanidine, or 4-tert-butylcatechol.

* * * * *